(12) United States Patent
Simon

(10) Patent No.: US 6,172,702 B1
(45) Date of Patent: Jan. 9, 2001

(54) CABLE/SATELLITE-READY TELEVISION SET

(76) Inventor: Rudy J. Simon, 100 Goff Rd., Dexter, ME (US) 04930

( * ) Notice: Under 35 U.S.C. 154(b), the term of this patent shall be extended for 0 days.

(21) Appl. No.: 09/401,579

(22) Filed: Sep. 22, 1999

(51) Int. Cl.[7] .................................. H04N 7/10; H04N 1/00
(52) U.S. Cl. .................................................................. 348/10
(58) Field of Search ............................ 348/5.5, 554–558, 348/731, 836, 839; 455/3.2, 132, 141, 347

(56) References Cited

U.S. PATENT DOCUMENTS

| | | | |
|---|---|---|---|
| 4,528,597 | * 7/1985 | Klein et al. | 358/254 |
| 4,737,993 | 4/1988 | DeVilbiss . | |
| 4,903,130 | * 2/1990 | Kitagawa et al. | 358/190 |
| 5,315,391 | * 5/1994 | Lee | 348/553 |
| 5,640,484 | * 6/1997 | Mankovitz | 386/83 |
| 5,717,471 | * 2/1998 | Stewart | 348/726 |
| 5,737,035 | 4/1998 | Rotzoll . | |
| 5,748,732 | * 5/1998 | Le Berre et al. | 380/10 |
| 5,828,945 | * 10/1998 | Klosterman | 455/4.2 |
| 5,838,383 | 11/1998 | Chimoto et al. . | |

* cited by examiner

*Primary Examiner*—Nathan Flynn
*Assistant Examiner*—Ngoc Vu
(74) *Attorney, Agent, or Firm*—Thomas L. Bohan

(57) ABSTRACT

A cable/satellite-ready television set. The main satellite chassis is incorporated into the television set and is linked to the inputs and outputs on the main television chassis. A cable/satellite control panel is integrated into the television cabinet and is accessible to the user on the front of the cabinet. The cable/satellite control panel has a satellite access card slot and control buttons, as well as an infrared signal input for a remote control device. The television set comes equipped with a single remote control device that will allow the user to select the mode of transmission (radio frequency broadcast, cable, satellite, wideband data, etc.) and the channel, as well as control other television functions such as controlling the volume and turning the television set on or off.

3 Claims, 2 Drawing Sheets

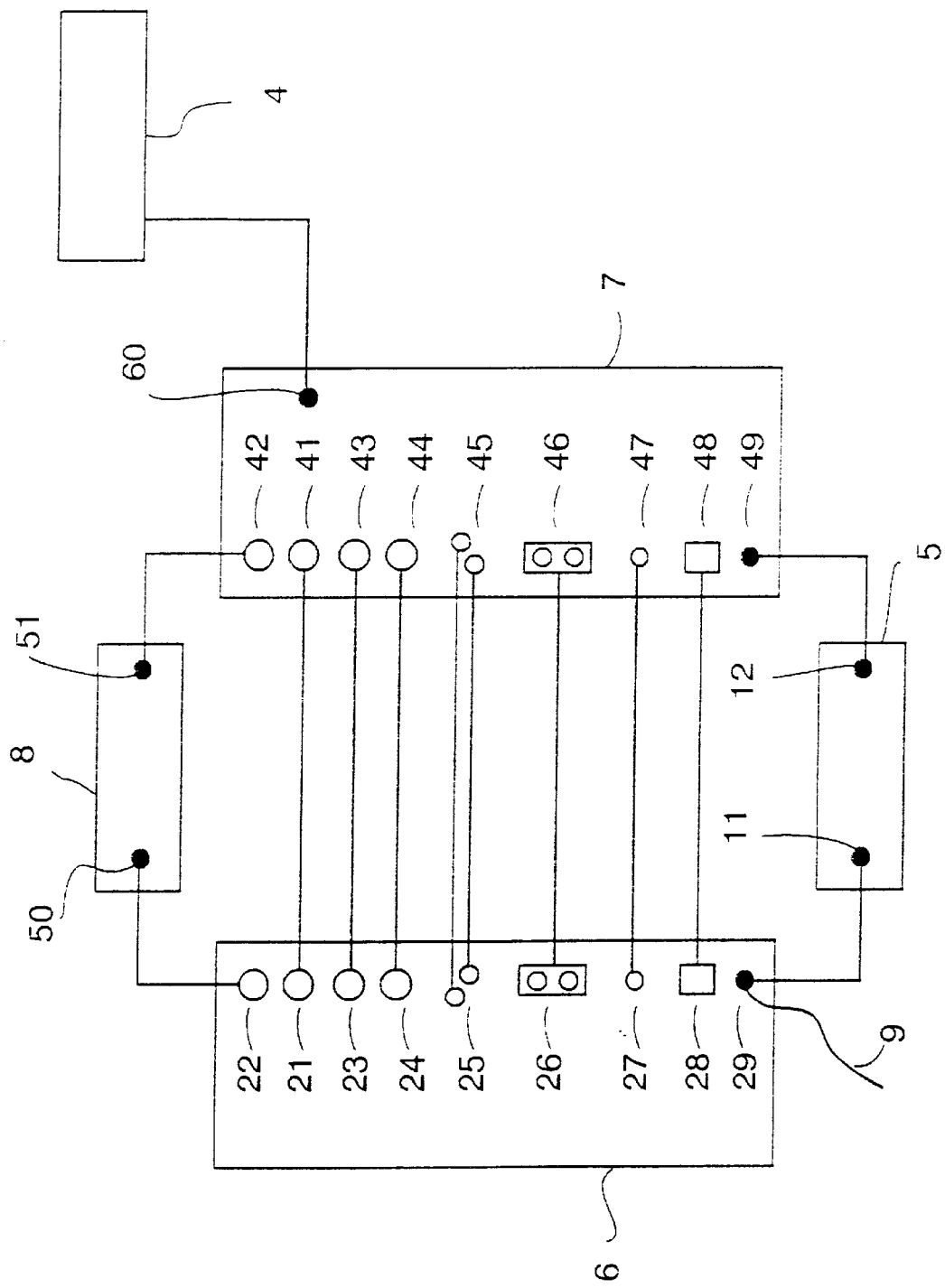

CABLE/SATELLITE-READY TELEVISION SET

BACKGROUND OF THE INVENTION

1. Field of the Invention

This invention relates to a television set. More particularly, the present invention relates to a television set equipped with a tuner capable of receiving television signals that are radio-frequency broadcast radio-frequency (rf) broadcast signals or signals transmitted by cable or by satellite. Yet more particularly, this invention relates to such a television set that does not require external tuner boxes. Finally, the present invention relates to such a television set capable of being operated through the use of a single set of controls.

2. Description of the Prior Art

At one time, television signals were radio-frequency (rf) signals broadcast through the air as VHF signals and, later, as UHF signals. Initially, only twelve VHF channels were broadcast. Within a few years, numerous channels of UHF television signals were being broadcast in addition to the VHF. Today, there are hundreds of channels of rf television signals being broadcast over the airwaves, plus television signals transmitted via cable or satellite systems. Initially, television sets were equipped with a tuner and a dial that could handle the twelve VHF channels. A second dial was added to enable the viewer to select a VHF or UHF channel. Nowadays, television sets typically have several external tuner boxers stacked on top of them, one or more to receive the numerous rf channels, one or more to receive the many cable channels, and one for the satellite channels. This plethora of external tuner boxes and the necessary cables to hook them to the television set is messy, unsightly, and can constitute a confusing array to the viewer who simply wants to turn on the television set and watch a particular channel. Each such external tuner box requires its own set of controls and each box interfaces with the channel-selection circuitry within the television set itself. Given this situation, it is desirable to have a television set capable of receiving broadcast rf, cable, and satellite television transmissions through the use of a single set of controls on the television set itself so that external tuner boxes and connecting cables can be eliminated.

There have been some prior-art attempts to move in this direction. For example, DeVilbiss (U.S. Pat. No. 4,737,993; issued 1988) discloses a tuning device capable of switching between broadcast and cable television transmissions, and simultaneously accommodating the different channels associated with the two broadcast modes. The DeVilbiss device, however, does not meet today§s needs in that it is not capable of receiving and handling satellite television transmissions in the desired fashion.

Rotzoll (U.S. Pat. No. 5,737,035; issued 1998) discloses a television tuner, capable of receiving broadcast and cable television transmissions, fully integrated on a single, physically small microcircuit capable of being produced inexpensively. As with the DeVilbiss device, the Rotzoll device is also incapable of handling satellite television transmissions in the desired fashion.

Chimoto et al. (U.S. Pat. No. 5,838,383; issued 1998) discloses a multimedia television receiver capable of receiving signals in a wide variety of transmission and digital formats. This invention is designed to incorporate a personal computer and video display into a unit capable of displaying both television signals and computer output. Although the Chimoto et al. device is capable of handling satellite transmissions, it is a complex and expensive device that requires a computer to control the display as well as input and channel selection.

None of the examples of prior art incorporates receivers and simple channel-selection controls for broadcast rf, cable, and satellite television signals in a single enclosure that includes the video display tube. Therefore, what is needed is a television set capable of receiving television signals from broadcast rf signals, cable systems, and digital satellite systems in an integrated fashion so that the television set requires no external tuner boxes. What is further needed is such a television set that requires for all modes of television reception but one set of controls, mounted within the cabinetry of the television set.

SUMMARY OF THE INVENTION

It is an object of the present invention to provide a television set capable of receiving broadcast rf signals, cable television signals, and digital satellite signals. It is a further object of the present invention to provide such a television set contained within a single enclosure. Finally, it is an object of the present invention to provide such a television set equipped with a single set of controls.

The present invention is a cable/satellite-ready television set having a single set of controls that the viewer uses to select (1) a mode of transmission (rf broadcast, cable or satellite) and (2) the desired channel. The television is equipped with a main television chassis that has inputs for antenna or cable, video, and audio, as well as inputs for satellite, wideband data, and Superior-Video (S-Video) and a modem connector. The main television chassis is connected to a television or satellite a/c power cord and feeds the incoming signal to the television tuner/demodulator. It is possible, of course, that, a cable-ready television may be equipped with a main television chassis and a main satellite chassis. In this case, the television signal comes in to the main television chassis, which is connected to the satellite, cable, or antenna system. The main television chassis then feeds the television signal to the main satellite chassis, which then feeds the signal to the television tuner/demodulator. The description of the present invention is based on a television set that is equipped with both a main television chassis and a main satellite chassis, although it is understood that it is well within the scope of the present invention to have a television that is equipped with only one main television chassis that will receive incoming rf, cable, satellite, S-video, or wideband data signals and will feed the television signal to the television tuner/demodulator.

The television set of the present invention is further equipped with a satellite system access card assembly. This access card assembly, which includes a receiver slot for the satellite access card, is connected to the digital satellite receiver on the main satellite chassis. A cable/satellite control panel which contains transmission-mode/channel-selection controls is mounted on the front of the television set and also connected to the digital satellite receiver input on the main satellite chassis. This cable/satellite control panel can be activated by the user via a single remote control device or via manual controls (push-buttons). The satellite system access card assembly and cable/satellite control panel are contained within the television cabinet, as are the main television chassis and the main satellite chassis with the digital satellite receiver input.

The user selects the desired rf/cable/satellite transmission mode by activating the infrared receiver device using the remote control device, and then uses the direction buttons on the remote control to select the desired mode and channel. It is possible to manually select the desired mode and channel by pressing the MENU button on the cable/satellite control panel and using the up/down/right/left buttons to make a selection. A satellite access card receiver assembly is mounted within the television cabinet. The user can insert an access card into a card slot that is integrated into the television cabinet. The modem connection provided on the main television chassis allows the user to dial up the satellite system server to order services and allows the system server to record information from the card for billing purposes.

The television set of the present invention encompasses cathode-ray picture tube television sets as well as television sets that use a wide screen projection monitor that is mounted in a cabinet or as a flat screen on a wall. With flat-screen televisions, in particular, where to place the various tuner boxes is a problem, as there is no cabinet on which to set them. Thus, the advantages of the television set of the present invention are ease of use for the user, as well as economic. The user can select the desired mode of television signal transmission and the channel, using only a single control panel that is integrated within the cabinet of the television set or is provided as a separate single control box for a flat-screen television. Furthermore, it is incomparably more convenient to hook up a television set or move to a new location one that has only a single control box and single power cord. It is more economical to manufacture a television set that incorporates the circuitry and power source for satellite and cable to provide the breadth of selection in mode of transmission and channels that the typical viewer desires, because it eliminates the necessity of manufacturing the various external tuner boxes with their connecting cables and power cables that are currently required. Finally, in addition to the advantages of convenience and economics, the television set of the present invention has a strong aesthetic advantage in that it eliminates the need to have numerous unsightly tuner boxes stacked on top of the television cabinet or on the floor, along with the unavoidable tangle of power and connecting cords.

DESCRIPTION OF THE ILLUSTRATIONS

FIG. 2 is a frontal view of a television set equipped with the main television chassis and the main satellite chassis of the present invention.

DETAILED DESCRIPTION OF THE PREFERRED EMBODIMENT

Figure 1:
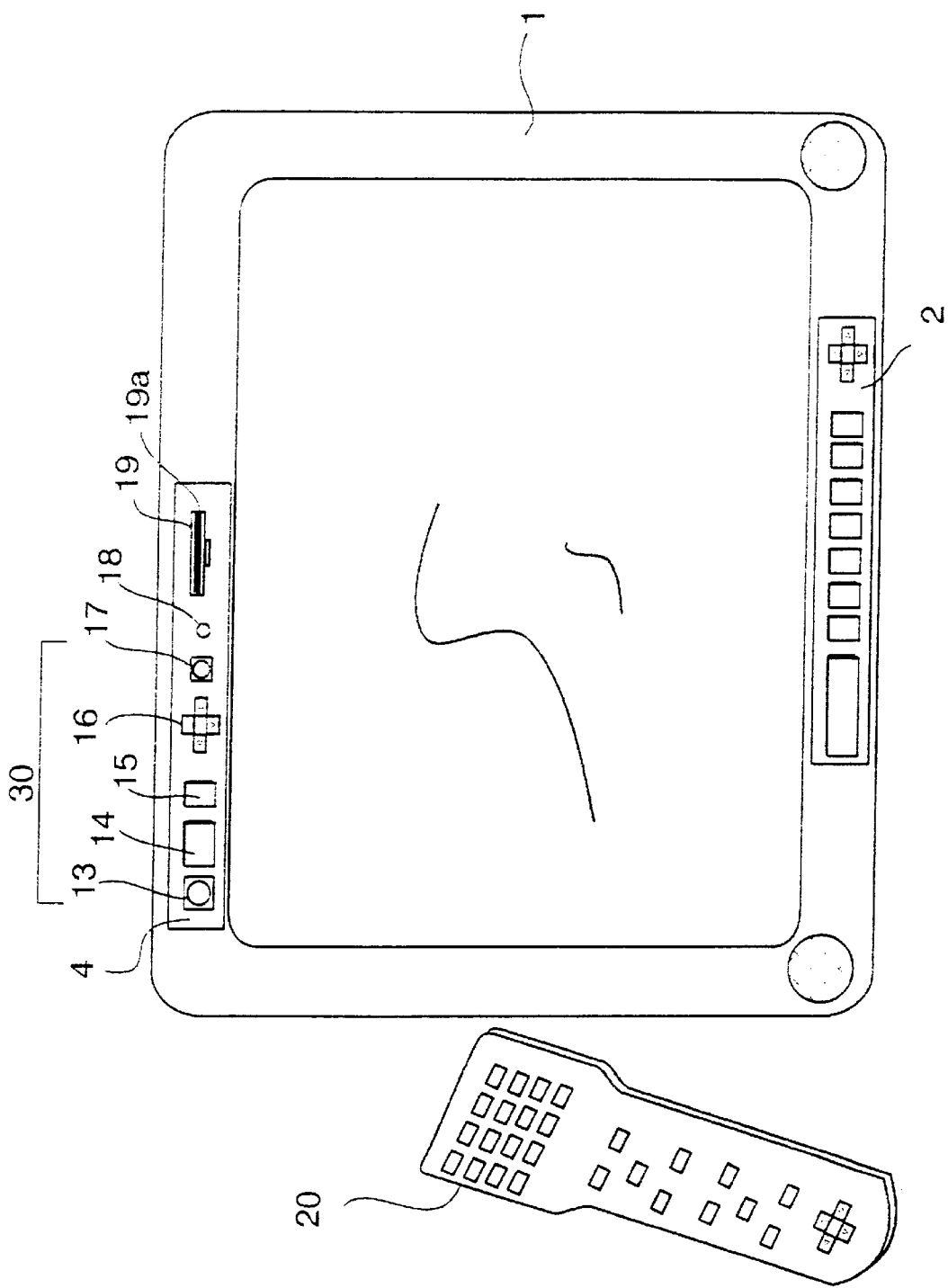
FIG. 1 is a block diagram of the main television chassis and the main satellite chassis of the present invention, showing the inputs on the main television chassis and the connections to the main satellite chassis.

The Preferred Embodiment of the present invention is a cable-satellite-ready television set 10, a front view of which is shown in FIG. 1. A schematic diagram of the connections for receiving rf, cable, and satellite transmissions is shown in FIG. 2. As can be seen in FIG. 1, the television set 10 is equipped with the standard television control panel 2 and speakers 3. In addition, the television set 10 has a transmission-mode/channel-selection panel 4 that is integrated into a cabinet 1 of the television set 10. The transmission-mode/channel control panel 4 includes a satellite-on/off-message-indicator 13, a series of manual control buttons 30, an infrared receiver for remote control 18, and a satellite access card slot 19. The manual control buttons 30 include a select-and-display button 14, a television/satellite selection button 15, four directional buttons 16, and a menu button 17 and are provided for manual selection of the transmission mode and channel.

In the Preferred Embodiment, a main television chassis 6, a main satellite chassis 7, a standard television tuner/demodulator 8, and a power supply 5 are built into the television set 10. As can be seen in the schematic diagram shown in FIG. 2, the main television chassis 6 of the Preferred Embodiment has a series of inputs that includes a first antenna input 21, a first superior-video (S-video) input 23, a first video input 24, a first pair of audio inputs 25, a first wideband-data-input 26, a first satellite input 27, a first modem connector 28, and a first alternating current (a/c) power input 29. An a/c power source 9 is connected to the first a/c power input 29, and that in turn is connected via an internal power supply 5 to a second a/c power input 49 on the main satellite chassis 7. The main television chassis 6 also has a first television output 22 that is connected to the tuner/demodulator 8, shown in FIG. 2 at 50. Each of the inputs and the output on the television main chassis 6 is connected to a corresponding second input or output on the main satellite chassis 7. Thus, the first antenna input 21 is connected to a second antenna input 41, the first S-video input to a second S-video input 43, the first video input 24 to a second video input 44, the first pair of audio inputs 25 to a second pair of audio inputs 45, the first wideband-data-input 26 to a second wideband-data-input 46, the first satellite input 27 to a second satellite input 47, and the first modem connector 28 to a second modem connector 48. The first television output 22 is also connected to a second television output 42, that in turn is also connected to the tuner/demodulator 8, shown in FIG. 2, at 51. The transmission-mode/channel-selection panel 4, shown in FIG. 1, is connected to a digital satellite receiver 60 on the main satellite chassis 7. The connections from the transmission-mode/channel-selection panel 4 are wellknown in the field and are not described herein in any detail as those connections are not included within the scope of the present invention.

The user will typically control the television set by means of a remote control 20, shown in FIG. 1. With the use of this remote control 20, the user will be able to select the desired mode of television signal transmission (rf, cable, satellite) and the channel, video or S-video, or wideband-data-input, as well as execute other wellknown functions, such as turning the television set 10 on or off, controlling the volume or the video, and so forth. The user may also use the series of manual control buttons 30 that are provided on the control panel 4 to select the mode of transmission and the channel.

While a Preferred Embodiment is disclosed, this is not intended to be limiting. Rather, the general principles set forth herein are considered to be merely illustrative of the scope of the present invention and it is to be further understood that numerous changes may be made without straying from the scope of the present invention.

I claim:

1. A cable/satellite-ready television set comprising:
   a television cabinet;
   a television screen, said television screen being built into said television cabinet;
   a television control panel, said television control panel being built into said television cabinet, said television control panel including a transmission-mode/channel selection panel;
   a television tuner/demodulator, said television tuner/demodulator being built into said television cabinet, said television tuner/demodulator having a first tuner/demodulator input and a second tuner/demodulator input;

a main television chassis, said main television chassis being built into said television cabinet, said main television chassis having a first alternating current (a/c) power input connector, said first a/c power input connector being connected to an internal television power supply unit, said main television chassis having a first television output connection and a series of first input connections, wherein alternating current from an external power source is applied to said first a/c power input connector;

a main satellite chassis, said main satellite chassis being built into said television cabinet, said main satellite chassis having a second a/c power input connector, said second a/c power input connector being connected to said internal television power supply unit, said main satellite chassis having a second output connection and a series of second input connections, said main satellite chassis having a digital satellite receiver; and a remote control device, said remote control device being capable of selecting a transmission mode from a plurality of transmission modes, said plurality of transmission modes including radio-frequency (rf) broadcast signal, cable television signal, satellite televise signal, superior video (S-Video), and wideband-data-input signal;

wherein said main television chassis output is connected to said first tuner/demaulator input and said main satellite chassis output is connected to said second tuner/demodulaor input.

2. The cable/satellite-ready television of claim 1 wherein said series of first input connections includes a first antenna input, a first S-Video input, a first pair of audio inputs, a first wideband-data input, a first satellite input, and a first modem input;

wherein said series of second input connections includes a second antenna input, a second S-Video input, a second pair of audio inputs, a second wideband-data input, a second satellite input, and a second modem input; and wherein each input of said series of first input connections is connected to a corresponding input of said series of second input connections.

3. The cable/satellite-ready television of claim 2 wherein said transmission-mode/channel selection panel includes a satellite access card slot and a plurality of transmission-mode/channel selection controls, said satellite access card slot and said plurality of transmission-mode/channel selection controls being connected to said digital satellite receiver.

* * * * *